US008976500B2

(12) United States Patent
Penwell et al.

(10) Patent No.: US 8,976,500 B2
(45) Date of Patent: Mar. 10, 2015

(54) DC BLOCK RF COAXIAL DEVICES

(75) Inventors: Chris Penwell, Minden, NV (US); Edward John Dickman, Hayden, ID (US)

(73) Assignee: Transtector Systems, Inc., Hayden, ID (US)

( * ) Notice: Subject to any disclaimer, the term of this patent is extended or adjusted under 35 U.S.C. 154(b) by 870 days.

(21) Appl. No.: 13/115,749

(22) Filed: May 25, 2011

(65) Prior Publication Data

US 2011/0292557 A1 Dec. 1, 2011

Related U.S. Application Data

(60) Provisional application No. 61/348,659, filed on May 26, 2010.

(51) Int. Cl.
*H02H 3/20* (2006.01)
*H01R 24/48* (2011.01)
*H01R 103/00* (2006.01)

(52) U.S. Cl.
CPC ............ *H01R 24/48* (2013.01); *H01R 2103/00* (2013.01)
USPC ............................................ 361/118; 307/90

(58) Field of Classification Search
CPC ............... H02H 1/00; H04B 1/00; H01T 1/00
USPC ................................................ 361/119, 118
See application file for complete search history.

(56) References Cited

U.S. PATENT DOCUMENTS 2,030,179 A 2/1936 Potter
3,167,729 A 1/1965 Hall
3,323,083 A 5/1967 Ziegler
3,619,721 A 11/1971 Westendorp
3,663,901 A 5/1972 Forney, Jr.
3,731,234 A 5/1973 Collins
3,750,053 A 7/1973 LeDonne
3,783,178 A 1/1974 Philibert
3,831,110 A 8/1974 Eastman
3,845,358 A 10/1974 Anderson et al.
3,944,937 A 3/1976 Fujisawa et al.
3,956,717 A * 5/1976 Fisher et al. .................. 333/121
3,980,976 A 9/1976 Tadama et al.

(Continued)

FOREIGN PATENT DOCUMENTS

CH 675933 A5 11/1990
JP 08-066037 3/1996

(Continued)

*Primary Examiner* — Rexford Barnie
*Assistant Examiner* — Toan Vu
(74) *Attorney, Agent, or Firm* — Snell & Wilmer LLP

(57) ABSTRACT

A DC block RF device includes a housing defining a cavity having a central axis, an input conductor disposed in the cavity of the housing and extending substantially along the central axis of the cavity and an output conductor disposed in the cavity of the housing and extending substantially along the central axis of the cavity. The DC block RF device further includes a first capacitor connected to the input conductor and a second capacitor connected to the output conductor and the first capacitor. In addition, the DC block RF device includes a coil for grounding surge signals, the coil having an inner edge connected to the center conductor and an outer edge connected to the housing of the device. During a surge, the first capacitor is configured to arc the surge across the capacitor without damaging the capacitor so the surge can dissipate through coil to ground.

19 Claims, 6 Drawing Sheets

(56) References Cited

U.S. PATENT DOCUMENTS

| | | | | |
|---|---|---|---|---|
| 4,021,759 | A | 5/1977 | Campi | |
| 4,046,451 | A | 9/1977 | Juds et al. | |
| 4,047,120 | A | 9/1977 | Lord et al. | |
| 4,112,395 | A | 9/1978 | Seward | |
| 4,262,317 | A | 4/1981 | Baumbach | |
| 4,356,360 | A | 10/1982 | Volz | |
| 4,359,764 | A | 11/1982 | Block | |
| 4,384,331 | A | 5/1983 | Fukuhara et al. | |
| 4,409,637 | A | 10/1983 | Block | |
| 4,481,641 | A | 11/1984 | Gable et al. | |
| 4,554,608 | A | 11/1985 | Block | |
| 4,563,720 | A | 1/1986 | Clark | |
| 4,586,104 | A | 4/1986 | Standler | |
| 4,689,713 | A | 8/1987 | Hourtane et al. | |
| 4,698,721 | A | 10/1987 | Warren | |
| 4,727,350 | A | 2/1988 | Ohkubo | |
| 4,952,173 | A | 8/1990 | Peronnet et al. | |
| 4,984,146 | A | 1/1991 | Black et al. | |
| 4,985,800 | A | 1/1991 | Feldman et al. | |
| 5,053,910 | A | 10/1991 | Goldstein | |
| 5,057,964 | A | 10/1991 | Bender et al. | |
| 5,102,818 | A | 4/1992 | Paschke et al. | |
| 5,122,921 | A | 6/1992 | Koss | |
| 5,124,873 | A | 6/1992 | Wheeler et al. | |
| 5,142,429 | A | 8/1992 | Jaki | |
| 5,166,855 | A | 11/1992 | Turner | |
| 5,170,151 | A | 12/1992 | Hochstein | |
| 5,278,720 | A | 1/1994 | Bird | |
| 5,321,573 | A | 6/1994 | Person et al. | |
| 5,353,189 | A | 10/1994 | Tomlinson | |
| 5,412,526 | A | 5/1995 | Kapp et al. | |
| 5,442,330 | A | 8/1995 | Fuller et al. | |
| 5,537,044 | A | 7/1996 | Stahl | |
| 5,611,224 | A | 3/1997 | Weinerman et al. | |
| 5,617,284 | A | 4/1997 | Paradise | |
| 5,625,521 | A | 4/1997 | Luu | |
| 5,667,298 | A | 9/1997 | Musil et al. | |
| 5,721,662 | A | 2/1998 | Glaser et al. | |
| 5,781,844 | A | 7/1998 | Spriester et al. | |
| 5,790,361 | A | 8/1998 | Minich | |
| 5,798,790 | A | 8/1998 | Knox et al. | |
| 5,844,766 | A | 12/1998 | Miglioli et al. | |
| 5,854,730 | A | 12/1998 | Mitchell et al. | |
| 5,953,195 | A | 9/1999 | Pagliuca | |
| 5,963,407 | A | 10/1999 | Fragapane et al. | |
| 5,966,283 | A | 10/1999 | Glaser et al. | |
| 5,982,602 | A | 11/1999 | Tellas et al. | |
| 5,986,869 | A | 11/1999 | Akdag | |
| 6,054,905 | A | 4/2000 | Gresko | |
| 6,060,182 | A | 5/2000 | Tanaka et al. | |
| 6,061,223 | A | 5/2000 | Jones et al. | |
| 6,086,544 | A | 7/2000 | Hibner et al. | |
| 6,115,227 | A | 9/2000 | Jones et al. | |
| 6,137,352 | A | 10/2000 | Germann | |
| 6,141,194 | A | 10/2000 | Maier | |
| 6,177,849 | B1 | 1/2001 | Barsellotti et al. | |
| 6,226,166 | B1 | 5/2001 | Gumley et al. | |
| 6,236,551 | B1 * | 5/2001 | Jones et al. | 361/119 |
| 6,243,247 | B1 | 6/2001 | Akdag et al. | |
| 6,252,755 | B1 | 6/2001 | Willer | |
| 6,281,690 | B1 | 8/2001 | Frey | |
| 6,292,344 | B1 | 9/2001 | Glaser et al. | |
| 6,342,998 | B1 | 1/2002 | Bencivenga et al. | |
| 6,381,283 | B1 | 4/2002 | Bhardwaj et al. | |
| 6,385,030 | B1 | 5/2002 | Beene | |
| 6,394,122 | B1 | 5/2002 | Sibley et al. | |
| 6,421,220 | B2 | 7/2002 | Kobsa | |
| 6,502,599 | B1 | 1/2003 | Sibley et al. | |
| 6,527,004 | B1 | 3/2003 | Sibley et al. | |
| 6,535,369 | B1 | 3/2003 | Redding et al. | |
| 6,650,203 | B2 | 11/2003 | Gerstenberg et al. | |
| 6,721,155 | B2 | 4/2004 | Ryman | |
| 6,754,060 | B2 | 6/2004 | Kauffman | |
| 6,757,152 | B2 | 6/2004 | Galvagni et al. | |
| 6,782,329 | B2 | 8/2004 | Scott | |
| 6,785,110 | B2 | 8/2004 | Bartel et al. | |
| 6,789,560 | B1 | 9/2004 | Sibley et al. | |
| 6,814,100 | B1 | 11/2004 | Sibley et al. | |
| 6,816,348 | B2 | 11/2004 | Chen et al. | |
| 6,968,852 | B1 | 11/2005 | Sibley | |
| 6,975,496 | B2 | 12/2005 | Jones et al. | |
| 7,082,022 | B2 | 7/2006 | Bishop | |
| 7,092,230 | B2 | 8/2006 | Inauen | |
| 7,104,282 | B2 | 9/2006 | Hooker et al. | |
| 7,106,572 | B1 | 9/2006 | Girard | |
| 7,130,103 | B2 | 10/2006 | Murata | |
| 7,159,236 | B2 | 1/2007 | Abe et al. | |
| 7,221,550 | B2 | 5/2007 | Chang et al. | |
| 7,250,829 | B2 | 7/2007 | Namura | |
| 7,338,547 | B2 | 3/2008 | Johnson et al. | |
| 7,371,970 | B2 | 5/2008 | Flammer et al. | |
| 7,430,103 | B2 | 9/2008 | Kato | |
| 7,453,268 | B2 | 11/2008 | Lin | |
| 7,471,172 | B2 | 12/2008 | Holst et al. | |
| 7,507,105 | B1 | 3/2009 | Peters et al. | |
| 7,623,332 | B2 | 11/2009 | Frank et al. | |
| 7,808,752 | B2 | 10/2010 | Richiuso et al. | |
| 7,817,398 | B1 | 10/2010 | Maples | |
| 2002/0167302 | A1 | 11/2002 | Gallavan | |
| 2002/0191360 | A1 | 12/2002 | Colombo et al. | |
| 2003/0072121 | A1 | 4/2003 | Bartel et al. | |
| 2003/0151870 | A1 | 8/2003 | Gronbach et al. | |
| 2003/0179533 | A1 * | 9/2003 | Jones et al. | 361/118 |
| 2003/0211782 | A1 | 11/2003 | Esparaz et al. | |
| 2004/0042149 | A1 | 3/2004 | Devine et al. | |
| 2004/0121648 | A1 | 6/2004 | Voros | |
| 2004/0145849 | A1 | 7/2004 | Chang et al. | |
| 2004/0264087 | A1 | 12/2004 | Bishop | |
| 2005/0036262 | A1 | 2/2005 | Siebenthall et al. | |
| 2005/0044858 | A1 | 3/2005 | Hooker et al. | |
| 2005/0176275 | A1 | 8/2005 | Hoopes et al. | |
| 2005/0185354 | A1 | 8/2005 | Hoopes | |
| 2005/0206482 | A1 * | 9/2005 | DuToit et al. | 333/205 |
| 2006/0038635 | A1 | 2/2006 | Richiuso et al. | |
| 2006/0120005 | A1 | 6/2006 | Van Sickle | |
| 2006/0139832 | A1 | 6/2006 | Yates et al. | |
| 2006/0146458 | A1 | 7/2006 | Mueller | |
| 2007/0053130 | A1 | 3/2007 | Harwath | |
| 2007/0095400 | A1 | 5/2007 | Bergquist et al. | |
| 2007/0097583 | A1 | 5/2007 | Harwath | |
| 2007/0139850 | A1 | 6/2007 | Kamel et al. | |
| 2008/0170346 | A1 * | 7/2008 | Van Swearingen | 361/119 |
| 2009/0103226 | A1 | 4/2009 | Penwell et al. | |
| 2009/0109584 | A1 | 4/2009 | Jones et al. | |
| 2009/0284888 | A1 | 11/2009 | Bartel et al. | |
| 2009/0296430 | A1 | 12/2009 | Rieux-Lopez et al. | |
| 2010/0150215 | A1 * | 6/2010 | Black | 375/224 |
| 2010/0295625 | A1 * | 11/2010 | Tanabe | 331/117 FE |
| 2011/0080683 | A1 | 4/2011 | Jones et al. | |
| 2011/0141646 | A1 | 6/2011 | Jones et al. | |
| 2011/0159727 | A1 | 6/2011 | Howard et al. | |

FOREIGN PATENT DOCUMENTS

| | | |
|---|---|---|
| JP | 11-037400 | 2/1999 |
| JP | 2003-070156 | 3/2003 |
| JP | 2003-111270 | 4/2003 |
| KR | 10-2003-0081041 | 10/2003 |
| KR | 1020090018497 | 2/2009 |
| WO | WO 9510116 | 4/1995 |
| WO | PCT/US03/17050 | 5/2003 |
| WO | WO 2011-119723 | 12/2011 |

* cited by examiner

DC BLOCK RF COAXIAL DEVICES

CROSS REFERENCE TO RELATED APPLICATIONS

This application claims the benefit and priority of U.S. Provisional Application No. 61/348,659, filed on May 26, 2010, the entire contents of which are hereby incorporated by reference.

BACKGROUND

1. Field

The present invention generally relates to DC blocking devices and improvements thereof. More particularly, the invention relates to DC block RF coaxial devices with surge protection and improvements thereof.

2. Description of the Related Art

DC block filters for use in electric circuits or between systems or devices are known and used in the art. Oftentimes in electrical systems, it is desirable to control input signal frequencies to a desired range of frequency values by blocking low frequency or DC signals from transmitting to a connected system or electrical component. Such signals can interfere with the designed operation of the connected system or damage the electrical components if not blocked along the transmission line. Devices, such as DC block filters, may be connected in-line along the transmission line to prevent the DC signals from encountering any connected equipment downstream from the filter.

Currently available DC block filters are commonly two-terminal devices and utilize a single capacitor connected in series between the two terminals. An input source is connected to one terminal and the hardware to be protected is connected to the other terminal. Depending upon the capacitor value of the DC block filter, certain voltage or current frequencies encounter a low impedance and are allowed to pass through the filter while other, lower frequency signals (e.g. DC signals) are blocked by the high impedance of the capacitor. Significant problems can arise if the capacitor of the DC block filter is damaged or otherwise fails and no longer operates to block the DC signals from reaching the connected hardware or equipment.

One particularly problematic cause of capacitor failure is the presence of a power surge on the transmission line utilizing the DC block filter. Power surges can originate from a variety of possible causes. One such cause is radio frequency (RF) interference that can couple to power or transmission lines from a multitude of sources. The power or transmission lines act as large antennas that may extend over several miles, thereby collecting a significant amount of RF noise from such sources as radio broadcast antennas. Another source of RF interference stems from equipment connected to the power or transmission lines that conducts along those lines to the equipment to be protected. In particular, older computer hardware may emit significant amounts of RF interference. A further cause of harmful electrical energy surges is conductive noise generated by equipment connected to the power or transmission lines which conducts along the lines to the equipment to be protected. Still another cause of disruptive electrical energy is lightning and typically arises when a lightning bolt strikes a component or transmission line that is coupled to the protected hardware or equipment. Lightning surges generally include DC electrical energy and AC electrical energy up to approximately 1 MHz in frequency and are complex electromagnetic energy sources having potentials estimated from 5 million to 20 million volts and currents reaching thousands of amperes.

Such electrical energy surges are often unpredictable and can significantly damage hardware or equipment either directly by entering the hardware or equipment via the transmission line or indirectly by damaging signal conditioning devices (e.g., DC block filters) connected in-line along the transmission line. Currently available DC block filters are particularly susceptible to such power surges since the incorporated capacitor is often not rated for high RF power and has a low breakdown voltage, for example of about 2 kV to 3 kV. The power surge, which can reach voltage levels of 20 kV or higher, will permanently damage the traditional DC block capacitor, often by shoot-through or punch-through of the capacitor dielectric or via carbon shorts. The surge will then continue to propagate down the transmission line towards any connected equipment. Incorporating a DC block capacitor with a much higher breakdown voltage to withstand the power surge is often not a viable solution since the use of such capacitors deteriorates the RF performance of the filter.

Even if the surge is mitigated by other surge suppression devices before reaching the connected equipment, the DC block filter will require replacement due to the permanent damage to the DC blocking capacitor. In certain cases, the failure of the DC block filter may not be readily apparent until the connected equipment begins to malfunction or fail due to the presence of unanticipated DC signal bias at its input. Contributing to the problem, communications equipment, computers, home stereo amplifiers, televisions and other electronic devices are increasingly manufactured using small electronic components that are increasingly vulnerable to damage from even small electrical signal variations outside the designed operating parameters. These signal variations can cost significant amounts in both damaged equipment or in maintenance costs to ensure filtering devices have not failed during their operation.

Therefore, a cost effective DC block device is needed to ensure hardware or equipment is adequately protected from undesirable DC signals even after a surge condition has propagated through the DC block device. Ideally, such a DC block device would have a compact size, a high return loss for passed RF signals, a low insertion loss for passed RF signals and a low voltage standing wave ratio (VSWR). In addition, the DC block device should be capable of continued operation to protect any connected equipment despite the occurrence of an electrical surge at the DC block device.

SUMMARY

A device for blocking DC signals and capable of continued operation without replacement after a surge condition is disclosed. In one embodiment, a DC block RF device includes a housing defining a cavity with a first conductor, a second conductor, a first capacitor, a second capacitor and a coil positioned within the cavity. The first capacitor has a first terminal electrically connected to the first conductor and a second terminal. The first capacitor is configured to pass a surge signal from the first terminal to the second terminal without damaging the first capacitor. The second capacitor has a first terminal electrically connected to the second conductor and a second terminal electrically connected to the second terminal of the first capacitor. The coil has an inner radius electrically connected to the second terminal of the first capacitor and an outer radius electrically connected to the housing.

In another embodiment, a DC block RF device includes a housing defining a cavity having a central axis, an input conductor disposed in the cavity of the housing and extending substantially along the central axis of the cavity and an output conductor disposed in the cavity of the housing and extending substantially along the central axis of the cavity. The DC block RF device further includes two N-Type end connectors, an N-Type input connector electrically connected to the input conductor and an N-Type output connector electrically connected to the output conductor. A first capacitor is connected to the input conductor and is configured to arc a predetermined level of surge voltage across the first capacitor without impairing the first capacitor. A second capacitor is connected to the output conductor and an inductor is disposed within the cavity, the inductor having an outer edge connected to the housing and an inner edge connected to the first capacitor and to the second capacitor.

In still another embodiment, a DC block RF device includes a housing defining a cavity having a central axis and an input conductor and an output conductor positioned substantially along a portion of the central axis within the cavity. A DIN input end connector is attached to the housing and coupled with the input conductor and a DIN output end connector is attached to the housing and coupled with the output conductor. A first capacitor is connected to the input conductor and is configured to arc a predetermined level of surge voltage across the first capacitor without damaging the first capacitor. A second capacitor is connected to the output conductor. A spiral inductor, positioned along a plane substantially perpendicular to the central axis, has an outer radius connected to the housing and an inner radius connected to the first capacitor and to the second capacitor.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
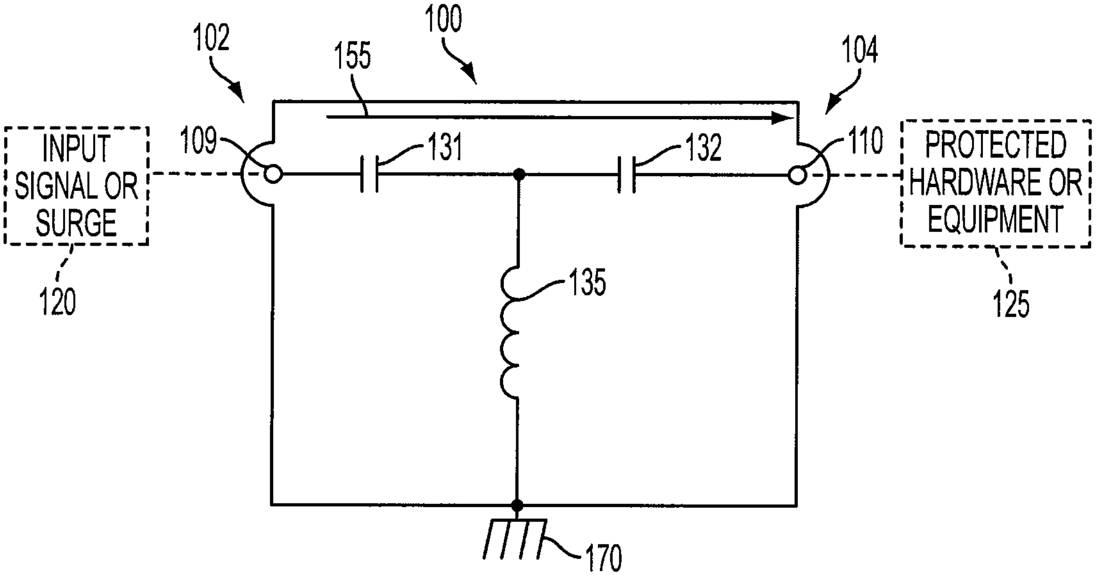
FIG. 1 is a schematic circuit diagram of a DC block RF coaxial device according to an embodiment of the invention.

Referring now to FIG. 1, a schematic circuit diagram of a DC block RF coaxial device 100 is shown. The device 100 blocks DC voltage or current from propagating to protected hardware or equipment 125 that is connected to the device 100. The device 100 also helps protect the hardware or equipment 125 from an electrical surge 120 that could damage, destroy or interfere with the hardware or equipment 125. The device 100 includes various electrical components, including capacitors and an inductor. For illustrative purposes, the schematic circuit diagram of the device 100 will be described with reference to specific capacitor and inductor values to achieve specific DC block and surge protection capabilities. However, other specific capacitor or inductor values or configurations may be used to achieve other performance characteristics. Similarly, although the embodiments are shown with particular capacitive devices, inductors and terminal connection elements, it is not required that the exact components described be used in the present invention. Thus, the capacitive devices, inductors and terminal connection elements are to illustrate the various embodiments and not to limit the present invention.

The frequency range of operation for the device 100 described by the schematic circuit diagram is between about 680 MHz and about 2.5 GHz. In one embodiment, the frequency range of operation is 680 MHz to 1 GHz, within which the insertion loss is specified less than 0.1 dB and the voltage standing wave ratio (VSWR) is specified less than 1.1:1. In another embodiment, the frequency range of operation is 1.0 MHz to 3.0 MHz (a telemetry band), within which the insertion loss is similarly specified less than 0.1 dB and the VSWR is specified less than 1.1:1. The values produced above can vary depending upon the tuning of the circuit for a particular frequency range, the degree of surge protection or the desired RF performance. The device 100 is designed for blocking DC signals and has a breakdown voltage of about 6 kV. In another embodiment, a different breakdown voltage (e.g., 10 kV or higher) may be achieved.

The device 100 has two connection terminals including an input port 102 having an input center conductor 109 and an output port 104 having an output center conductor 110. The connection at the input port 102 or the output port 104 may be a coaxial line with center pins as the input center conductor 109 or the output center conductor 110 for propagating RF signals and an outer shield that surrounds the center pins. The input port 102 or output port 104 may be of either gender (male or female) and of various connector types (e.g., N-Type, P-Type, DIN, etc.). Moreover, the device 100 is bidirectional, hence the input port 102 may function as an output port and the output port 104 may function as an input port. By electrically connecting the device 100 along a conductive path or transmission line between an input signal or power source and the connecting hardware or equipment 125, an undesirable DC signal or electrical surge 120 present at the input port 102 will be blocked by the device 100 or propagated to ground through the device 100, as described in greater detail herein. The protected hardware can be any communications equipment, cell tower, base station, PC computer, server, network component or equipment, network connector or any other type of surge or DC sensitive electronic equipment.

The device 100 has various components coupled between the input center conductor 109 and the output center conductor 110, the components structured to form a desired impedance (e.g., 50Ω) and for providing an RF signal path 155 through the device 100. This RF path 155 blocks DC voltage or current from propagating between the input port 102 and the output port 104. The RF path 155 includes the input center conductor 109, a first DC blocking capacitor 131, a second DC blocking capacitor 132 and an output center conductor 110 coupled to the protected hardware and equipment 125. During normal operation, RF signals travel across the RF path 155 from the input center conductor 109 through the first and second capacitors 131 and 132 to the output center conductor 110. As stated above, the device 100 can operate in a bidirectional RF manner, thus the protected hardware or equipment 125 can receive or transmit RF signals along the RF path 155.

The first capacitor 131 and the second capacitor 132 are positioned in series between the input center conductor 109 and the output center conductor 110 in order to block DC signals and undesirable surge transients. The first and second capacitors 131 and 132 each have a value between about 3 picoFarads (pF) and about 15 pF wherein higher capacitance values allow for better low frequency performance. Preferably, the first and second capacitors 131 and 132 each have a value of about 4.5 pF. The first or second capacitors 131 or 132 may be realized in either lumped or distributed form or may be realized by parallel rods, coupling devices, conductive plates or any other device or combination of elements which produces a capacitive effect. The first and second capacitors 131 and 132 can have the same capacitance value or different capacitance values. The capacitance of the first or second capacitors 131 or 132 can vary depending upon the frequency of operation desired and will block the flow of DC signals while permitting the flow of AC signals along the RF path 155 depending on the chosen capacitance or frequency values. At certain frequencies, the first or second capacitors 131 or 132 may operate to attenuate the AC signals.

When DC signals travel on the input center conductor 109 and reach the first capacitor 131, the high impedance of the first capacitor 131 at low frequencies blocks the DC signal from propagating through the first capacitor 131. The connected equipment or hardware 125 is thus protected from such voltages or currents and only encounter the RF signals allowed to pass through the first capacitor 131 and along the RF path 155. For high-voltage DC signals, such as during a surge condition, rather than damaging or impairing the capacitor for future operation, the surge is allowed to pass over the first capacitor 131 via a designed or controlled spark-over. The voltages or currents are designed to arc over an air gap of the first capacitor 131 and appear on the other side of the first capacitor 131 without causing a failure of the first capacitor 131, as discussed in greater detail herein.

After the spark-over across the first capacitor 131 and instead of continuing along the RF path 155, the surge 120 is shunted to a ground 170 through a coil or inductor 135. At low frequencies (e.g., DC signals), the inductor 135 acts as a short and allows these surge voltages or currents to flow with little impedance through the inductor 135. Hence, the output center conductor 110 coupled to the hardware or equipment 125 is not exposed to the high voltages or currents and thus the connected hardware or equipment 125 is protected. Preferably, the inductor 135 is a spiral inductor having an inner edge or radius connected to the first capacitor 131 and an outer edge or radius connected to the housing. The inductor 135 may be replaced with or used in conjunction with a variety of low impedance elements (e.g., a quarter-wave stub, a diode, a gas tube, etc.). Integrating a low impedance element between the first capacitor 131 and the second capacitor 132 to ground 170 prevents a voltage differential from building up on the second capacitor 132.

Figure 2:
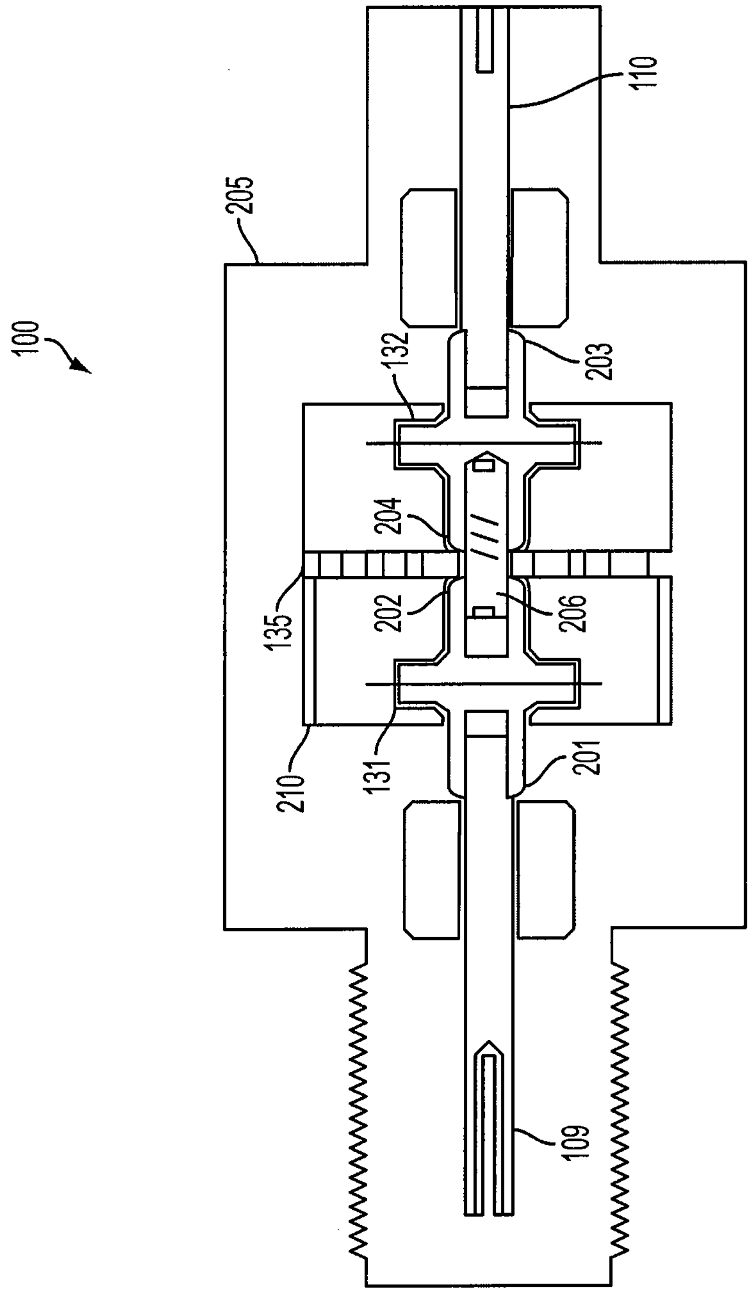
FIG. 2 is a cross-sectional view of the DC block RF coaxial device having the schematic circuit diagram shown in FIG. 1 according to an embodiment of the invention.

Turning now to FIG. 2, a cross-sectional view of the DC block RF coaxial device 100 having the schematic circuit diagram shown in FIG. 1 is shown. The device 100 has a housing 205 that defines a cavity 210. The cavity 210 is preferably formed in the shape of a cylinder and has an inner radius of approximately 432.5 mils. In an alternative embodiment, the cavity 210 can be formed of any shape and of varying sizes. The input center conductor 109 and the output center conductor 110 are positioned concentric with and located within the cavity 210 of the housing 205.

The first capacitor 131, the second capacitor 132 and the inductor 135 are also positioned within the cavity 210 of the housing 205. The input and output center conductors 109 and 110 are positioned along a central axis within the cavity 210. The first capacitor 131 has a first terminal 201 connected to the input center conductor 109 and a second terminal 202. Similarly, the second capacitor 132 has a first terminal 203 connected to the output center conductor 110 and a second terminal 204. The second terminals 202 and 204 of the first and second capacitors 131 and 132 electrically connect with the inductor 135 as described below. Each of the first or second capacitors 131 or 132 may be formed as parallel conductive plates with an insulative material or dielectric positioned between the plates. The inductor 135 is positioned along a plane such that the central axis of the input and output conductors 109 and 110 is positioned substantially perpendicular to the plane. In an alternative embodiment, the inductor 135 may be positioned differently within the housing 205.

A set screw or other fastening element 206 is coupled to the first capacitor 131 and to the second capacitor 132 for positioning the first capacitor 131 and the second capacitor 132 against and in electrical contact with an inner radius of the inductor 135 in order to form a conductive path or node where the first capacitor 131, the second capacitor 132 and the inductor 135 meet (see FIG. 1). The set screw 206 may be non-conductive and used merely to position the terminals of the first capacitor 131, the second capacitor 132 and the inductor 135 in contact with each other to form the above-described conductive path or node. In an alternative embodiment, the set screw 206 may itself be conductive and used to propagate electrical signals along its length.

Preferably, the inductor 135 is a spiral inductor that has a small footprint and may be formed as a flat, planar design. The inductor 135 has a preferred value of about 3 nH. In an alternative embodiment, other inductance values may be chosen for the inductor 135 to obtain the desired circuit performance. The chosen value for the inductor 135 helps determine the specific RF range of operation for the device 100. The diameter, surface area, thickness and shape of the inductor 135 can be varied to adjust the operating frequencies and current handling capabilities of the device 100. In one embodiment, an iterative process may be used to determine the diameter, surface area, thickness and shape of the inductor 135 to meet the requirements of a particular application. In the preferred embodiment, the diameter of the inductor 135 of the device 100 is about 0.865 inches and the thickness of the inductor 135 is about 0.062 inches. Furthermore, the inductor 135 spirals in an outward direction.

The material composition of the inductor 135 helps determine the amount of charge that can be safely dissipated across the inductor 135. A high tensile strength material allows the inductor 135 to discharge or divert a greater amount of current. In one embodiment, the inductor 135 is made of a 7075-T6 Aluminum material. Alternatively, any material having sufficient tensile strength and conductivity for a given application may be used to manufacture the inductor 135. Each of the components or the housing 205 may be plated with a silver material or a tri-metal flash plating. This reduces or eliminates the number of dissimilar or different types of metal connections or components in the RF path to improve passive inter-modulation ("PIM") performance.

The inductor 135 is positioned within the cavity 210 between the first and second capacitors 131 and 132 and has an inner edge with an inner radius of approximately 62.5 mils and an outer edge with an outer radius of approximately 432.5 mils. The inner edge or radius of the inductor 135 is coupled to the second terminals 202 and 204 of the first and second capacitors 131 and 132. The outer edge or radius of the inductor 135 is coupled to the housing 205. The housing 205 may operate as a ground connection to facilitate the shunting of DC signals or surges out of the RF path 155.

Each spiral of the inductor 135 spirals in an outward direction. In one embodiment, the inductor 135 has three spirals. The number of spirals and thickness of each spiral can be varied depending on the requirements of a particular application. The spirals of the inductor 135 may be of a particular known type such as the Archimedes, Logarithmic, Hyperbolic or any combination of these or other spiral types.

With reference to FIG. 1 and during normal operation, the first and second capacitors 131 and 132 prevent DC signals from traveling along the RF path 155 to the protected hardware or equipment 125. During a surge condition however, when the surge 120 exceeds the first capacitor 131 breakdown voltage rating, the surge voltage or current is configured to arc across an air gap of the first capacitor 131 via a desired spark-over. The spark-over is configured to occur before the surge 120 permanently damages, impairs or causes a failure (e.g., punch-through of the dielectric, carbon shorts, etc) of the first capacitor 131.

The electrical energy reaches the inner edge of the inductor 135, travels in an outward direction through the spirals of the inductor 135 towards the outer edge and is dissipated to ground via the housing 205. By directing the surge voltages or currents to ground, the voltage potential across the second capacitor 132 is kept below its voltage breakdown rating. By keeping the voltage across the second capacitor 132 low, the surge 120 will not make its way to the protected hardware or equipment 125. Thus, the surge 120 is shunted to ground after bypassing the first capacitor 131 while the second capacitor 132 keeps the surge 120 from encountering the connected hardware or equipment 125.

Figure 3:
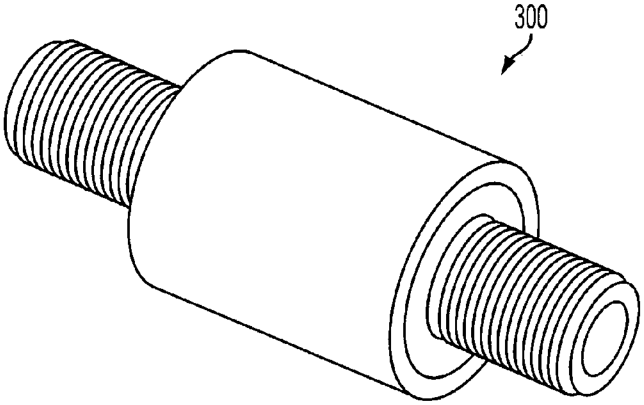
FIG. 3 is a perspective view of the DC block RF coaxial device having the schematic circuit diagram shown in FIG. 1 and having N-type female-female press-fit end connectors according to an embodiment of the invention.
Figure 4:
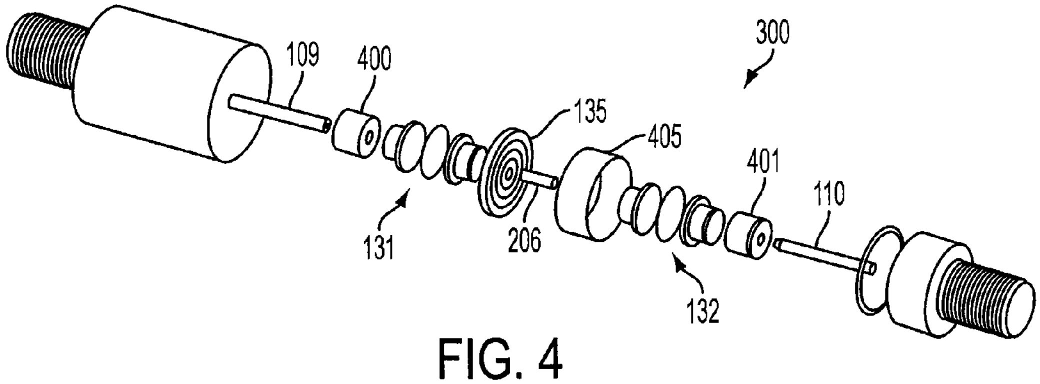
FIG. 4 is a disassembled perspective view of the DC block RF coaxial device of FIG. 3 having N-type female-female press-fit end connectors according to an embodiment of the invention.

One embodiment of the device 100 described above for FIG. 1 is shown in FIG. 3 and FIG. 4. FIG. 3 shows a perspective view of a device 300 having N-type female-female press-fit end connectors. FIG. 4 shows the same device 300 but in a disassembled view for easier identification of the components contained within. The input center conductor 109 and the output center conductor 110 are shown on opposite ends of the device 300. The input center conductor 109 electrically connects with one of the N-type female press-fit end connectors. The output center conductor 110 electrically connects with the other N-type female press-fit end connector. By inserting the device 300 in-line along a transmission line between an input source and any hardware or equipment to be protected, the device 300 can thus shield the hardware or equipment from DC signals that would otherwise be propagated along the transmission line to the hardware or equipment.

The input center conductor 109 and the output center conductor 110 are connected via a number of intermediate components, as discussed above for FIG. 1 and FIG. 2. Inserts or insulating members 400 and 401 isolate the input and output conductors 109 and 110 from the housing and are made of Teflon, but may be made of a variety of other materials (e.g., PTFE) in an alternative embodiment. The first and second capacitors 131 and 132 electrically couple to each other and to the inner radius of the inductor 135 within the housing of the device 300. The set screw or fastening element 206 positions the first and second capacitors 131 and 132 and the inductor 135 together so they make electrical contact as described in greater detail above. A conductive ring 405 electrically connects with the outer radius of the inductor 135 and operates to connect the outer radius to the housing of the device 300. The housing may be used as a ground for the propagation of surge voltages and currents outside of the RF path 155 (see FIG. 1).

The first capacitor 131 is constructed of a pair of conductive plates with a dielectric there between. The dielectric is preferably made of Teflon. The second capacitor 132 is constructed in the same manner. During normal operation, the first capacitor 131 blocks DC currents present on the input center conductor 109 from reaching the output center conductor 110. During a surge condition, instead of the high voltage or current values causing a failure or destroying the first capacitor 131, the first capacitor 131 is designed to arc the surge voltage or current over the dielectric from one conductive plate to the other. In this manner, the dielectric is unharmed and the first capacitor 131 maintains the same operational characteristics both before and after the surge condition. The surge can then be dissipated to ground (e.g., the housing) through the inductor 135 while the second capacitor 132 continues to prevent undesirable signals from reaching the connected hardware or equipment.

By designing the first capacitor 131 to arc a predetermined level of surge voltage or current over the terminals of the first capacitor 131 before allowing failure of the first capacitor 131 due to a surge-induced punch-through of the dielectric or via carbon shorts, the device 300 can thus continue to operate as a DC block providing an RF path even after encountering a surge condition that would destroy most DC blocking devices.

Figure 5:
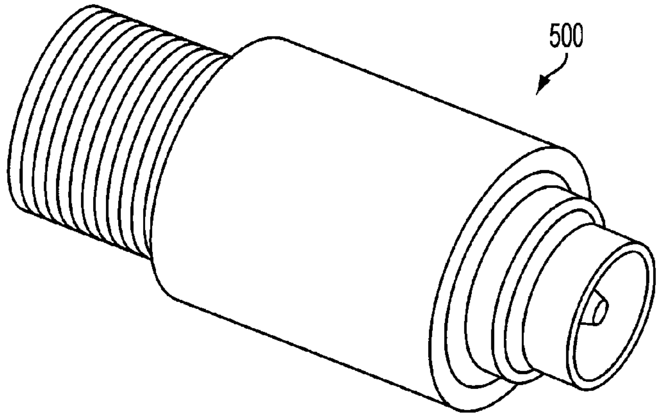
FIG. 5 is a perspective view of the DC block RF coaxial device having the schematic circuit diagram of FIG. 1 and having DIN male-female end connectors according to an embodiment of the invention.
Figure 6:
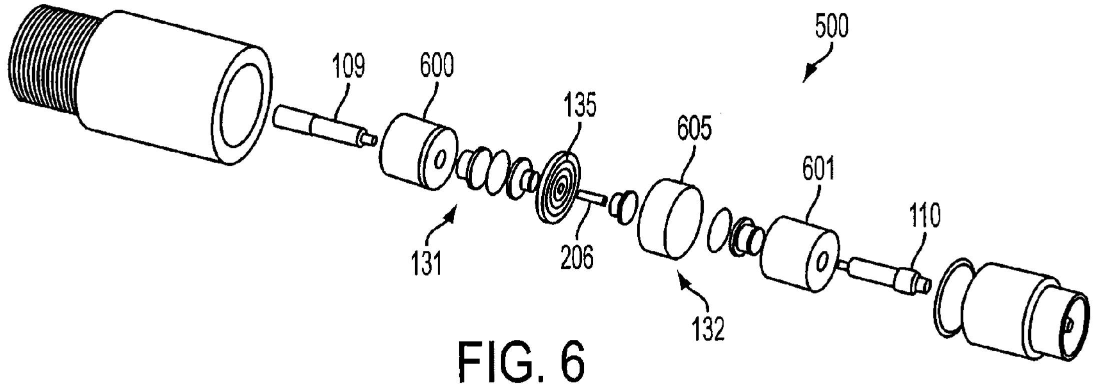
FIG. 6 is a disassembled perspective view of the DC block RF coaxial device of FIG. 5 having DIN male-female end connectors according to an embodiment of the invention.

Another embodiment of the device 100 described above for FIG. 1 is shown in FIG. 5 and FIG. 6. FIG. 5 shows a perspective view of a device 500 having DIN male-female end connectors. FIG. 6 shows the same device 500 but in a disassembled view for easier identification of the components contained within. The device 500 is similar to the device 300 described above, but incorporates different end connectors. The input center conductor 109 electrically connects with the DIN female press-fit end connector. The output center conductor 110 electrically connects with the DIN male press-fit end connector. By connecting the device 500 in-line along a transmission line between an input source and any hardware or equipment to be protected, the device 500 can thus shield the hardware or equipment from DC signals that would otherwise be propagated along the transmission line.

Like described above for FIG. 4, the input center conductor 109 and the output center conductor 110 are connected via a number of intermediate components. Inserts or insulating members 600 and 601 isolate the input and output conductors 109 and 110 from the housing and are made of Teflon, but may be made of a variety of other materials (e.g., PTFE) in an alternative embodiment. A set screw or fastening element 206 couples the first and the second capacitors 131 and 132 to each other and to the inner radius of the inductor 135 within the housing of the device 500. A conductive ring 605 electrically connects the outer radius of the inductor 135 to the housing of the device 500 in order to provide a ground for surge voltages or currents. Operation of the device 500 is similar to that described above for FIG. 4.

Figure 7:
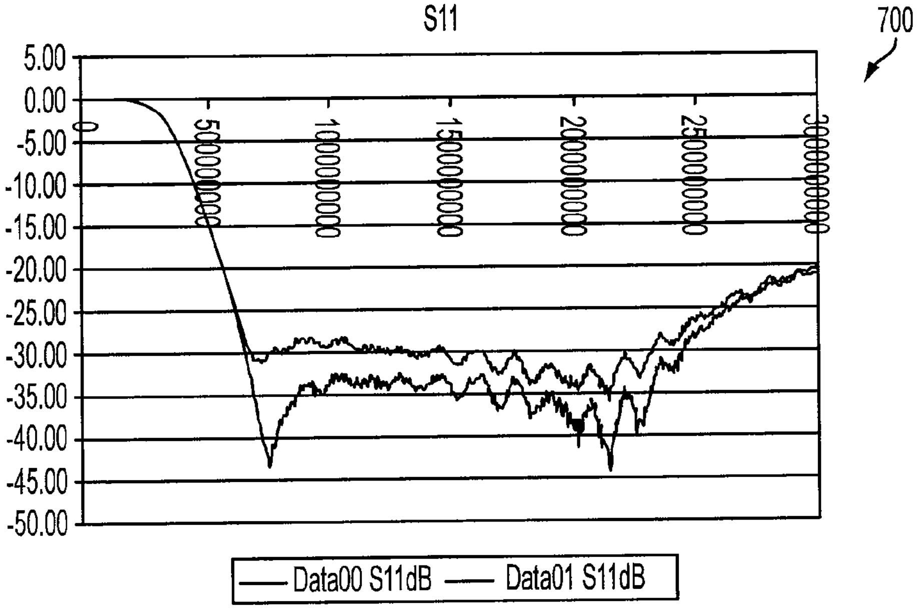
FIG. 7 is a graph of the input in-band return loss of the DC block RF coaxial device having the schematic circuit diagram shown in FIG. 1 according to an embodiment of the invention.
Figure 8:
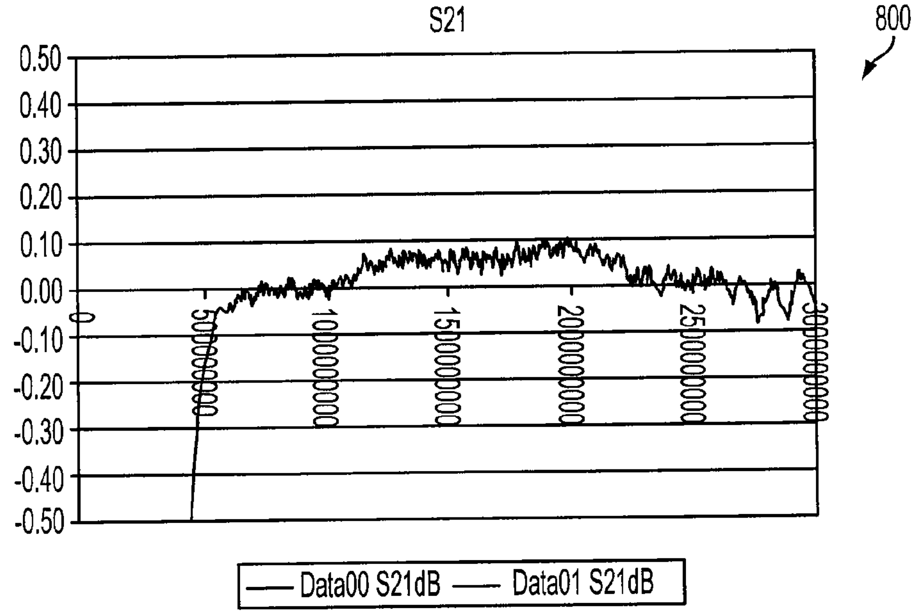
FIG. 8 is a graph of the input in-band insertion loss of the DC block RF coaxial device having the schematic circuit diagram shown in FIG. 1 according to an embodiment of the invention.

Referring now to FIG. 7 and FIG. 8 and with reference to FIG. 1, graphs are displayed showing in-band operating characteristics of the input of the device 100. Graph 700 (see FIG. 7) shows the input in-band return loss of the device 100. For signals operating at frequencies passed through the first capacitor 131 and the second capacitor 132 along the RF path 155, a high return loss (e.g., at least 20 dB) is desirable. The device 100 has been configured for an operating frequency range of about 680 MHz to about 2.5 GHz as described above for FIG. 1. As shown by the graph 700, the return loss for the device 100 varies between about 25 dB and about 45 dB within that operating frequency range. Thus, the device 100 exhibits desirable circuit performance over the designed operating frequency range.

Graph 800 (see FIG. 8) shows the input in-band insertion loss of the device 100. For signals operating at frequencies passed through the first capacitor 131 and the second capacitor 132 along the RF path 155, a low insertion loss (e.g., below 0.4 dB) is desirable. The device 100 has been configured for an operating frequency range of about 680 MHz to about 2.5 GHz as described above for FIG. 1. As shown by the graph 800, the insertion loss for the device 100 varies up to a maximum of about 0.1 dB within that operating frequency range. Thus, the device 100 exhibits desirable circuit performance over the designed operating frequency range.

Figure 9:
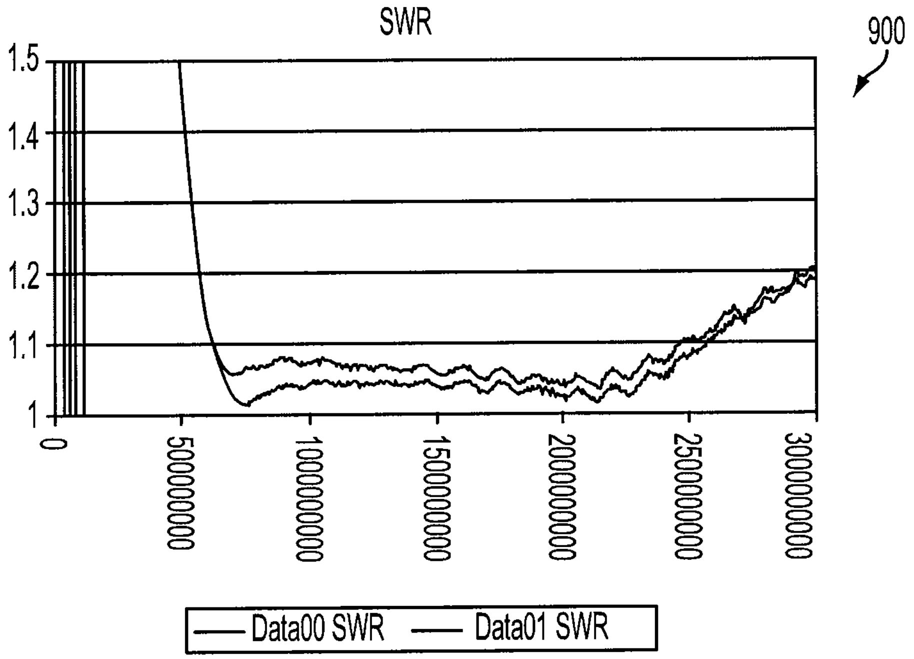
FIG. 9 is a graph of the standing wave ratio of the DC block RF coaxial device having the schematic circuit diagram shown in FIG. 1 according to an embodiment of the invention.

FIG. 9 displays a graph 900 showing the in-band voltage standing wave ratio (VSWR) of the device 100. The device 100 has been configured for an operating frequency range of about 680 MHz to about 2.5 GHz as described above for FIG. 1. VSWR denotes a ratio between a maximum standing wave amplitude and a minimum standing wave amplitude and is used as a measure of efficiency for transmission lines that carry RF signals. Within the operating frequency range of the device described above, the VSWR for the device 100 is about 1.1:1. Thus, the device 100 exhibits desirable circuit performance over the designed operating frequency range.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A DC block RF device comprising:
- a housing defining a cavity;
- a first conductor positioned within the cavity of the housing;
- a second conductor positioned within the cavity of the housing;
- a first capacitor positioned within the cavity of the housing and having a first terminal electrically connected to the first conductor, a second terminal, a dielectric therebetween and an air gap positioned adjacent to the dielectric, the first capacitor configured to pass a surge signal from the first terminal to the second terminal via the air gap without damaging the dielectric;
- a second capacitor positioned within the cavity of the housing, the second capacitor having a first terminal electrically connected to the second conductor and a second terminal electrically connected to the second terminal of the first capacitor;
- a coil positioned within the cavity of the housing and having an inner radius electrically connected to the second terminal of the first capacitor and an outer radius; and
- a conductive ring positioned within the cavity of the housing and electrically connected to the outer radius of the coil and to the housing.

2. The DC block RF device of claim 1 wherein the first capacitor and the second capacitor are configured to block DC signals and propagate RF signals between the first conductor and the second conductor and the coil is configured to propagate the surge signal to the housing via the conductive ring.

3. The DC block RF device of claim 1 wherein the first conductor or the second conductor comprises a center pin of a coaxial line that propagates RF signals and an outer shield that surrounds the center pin.

4. The DC block RF device of claim 1 wherein the first capacitor maintains the same operational characteristics before and after the passing of the surge signal.

5. The DC block RF device of claim 4 wherein the passing of the surge signal comprises a predetermined spark-over across the air gap of first capacitor.

6. The DC block RF device of claim 1 wherein the dielectric is made of Teflon.

7. The DC block RF device of claim 1 wherein the coil is positioned between the first capacitor and the second capacitor.

8. A DC block RF device comprising:
- a housing defining a cavity having a central axis;
- an input conductor disposed in the cavity of the housing and extending substantially along the central axis of the cavity;
- an N-Type input connector coupled to the housing and connected to the input conductor;
- an output conductor disposed in the cavity of the housing and extending substantially along the central axis of the cavity;
- an N-Type output connector coupled to the housing and connected to the output conductor;
- a first capacitor having a first terminal, a second terminal, a dielectric therebetween and an air gap positioned adjacent the dielectric, the first capacitor disposed in the cavity and connected to the input conductor and configured to arc a predetermined level of surge voltage across the air gap without impairing the dielectric;
- a second capacitor disposed in the cavity and connected to the output conductor;
- a conductive ring positioned within the cavity of the housing and connected to the housing; and
- an inductor disposed in the cavity and having an outer edge connected to the conductive ring and an inner edge connected to the first capacitor and to the second capacitor.

9. The DC block RF device of claim 8 wherein the first capacitor has the same DC blocking or RF propagating operational performance after the arcing of the predetermined level of surge voltage across the first capacitor.

10. The DC block RF device of claim 8 wherein the predetermined level of surge voltage is about 6 kV.

11. The DC block RF device of claim 9 wherein the inductor is a spiral inductor.

12. The DC block RF device of claim 11 wherein the spiral inductor is positioned along a plane substantially perpendicular to the central axis of the cavity.

13. The DC block RF device of claim 11 wherein the spiral inductor has a spiral selected from a group consisting of Archimedes, Logarithmic, Hyperbolic, and any combinations thereof.

14. The DC block RF device of claim 11 wherein the spiral inductor has three spirals.

15. A DC block RF device having an operational RF range, the device comprising:

a housing defining a cavity having a central axis;

an input conductor positioned within the cavity and substantially along a portion of the central axis;

a DIN input connector attached to the housing and coupled with the input conductor;

an output conductor positioned within the cavity and substantially along a portion of the central axis;

a DIN output connector attached to the housing and coupled with the output conductor;

a first capacitor having a first terminal, a second terminal, a dielectric therebetween and an air gap positioned adjacent the dielectric, the first capacitor positioned within the cavity, and coupled with the input conductor and configured to arc a predetermined level of surge voltage across the air gap without damaging the dielectric;

a second capacitor positioned within the cavity and coupled with the output conductor;

a conductive ring positioned within the cavity of the housing and connected to the housing; and a spiral inductor positioned within the cavity and along a plane substantially perpendicular to the central axis, the spiral inductor having an outer radius coupled with the housing via the conductive ring and an inner radius coupled with the first capacitor and with the second capacitor.

16. The DC block RF device of claim 15 further comprising an insulating member positioned within the cavity of the housing and encompassing the input conductor or the output conductor for electrically isolating the input conductor or the output conductor from the housing.

17. The DC block RF device of claim 15 further comprising a fastening element positioned within the cavity of the housing and coupled with the first capacitor and with the second capacitor for coupling the first capacitor and the second capacitor with the inner radius of the spiral inductor.

18. The DC block RF device of claim 15 wherein the operational RF range is between about 680 MHz and about 2.5 GHz.

19. The DC block RF device of claim 15 wherein the first capacitor and the second capacitor have the same capacitance.

* * * * *